United States Patent [19]

Beyersdorf

[11] 3,935,465

[45] Jan. 27, 1976

[54] IONIZATION ANALYZING AIR POLLUTION, SMOKE AND FIRE ALARM DEVICE

[75] Inventor: Hartwig Beyersdorf, Scharbeutz, Germany

[73] Assignee: GEBA-Gesellschaft fuer Elektronische Brandmeldeanlagen mbH, Hamburg, Germany

[22] Filed: Apr. 11, 1974

[21] Appl. No.: 460,041

[30] Foreign Application Priority Data

| | | |
|---|---|---|
| Apr. 24, 1973 | Germany | 2320604 |
| Jan. 24, 1974 | Germany | 2403418 |
| Apr. 24, 1973 | Germany | 7315459 |
| Jan. 24, 1974 | Germany | 7402420 |

[52] U.S. Cl. .............. 250/384; 250/381; 340/237 S

[51] Int. Cl.$^{2}$ ....................... G01T 1/18; H01J 39/28

[58] Field of Search .................... 250/384, 381, 389; 340/237 S

[56] References Cited

UNITED STATES PATENTS

| | | | |
|---|---|---|---|
| 3,358,140 | 12/1967 | Curran et al. | 250/384 |
| 3,560,737 | 2/1971 | Skildum | 250/384 |
| 3,662,177 | 5/1972 | Sasaki | 250/384 |

*Primary Examiner*—Harold A. Dixon
*Attorney, Agent, or Firm*—Otto John Munz

[57] ABSTRACT

An ionization analyzing alarm system of extreme accuracy independent of atmospheric turbulences caused by fire and of minute dimensions, ease and safety of manufacture, assembly and repairs and devoid of forced air devices, is provided, having an air baffle zone, a first ionization chamber with advantageously located electrodes, radioactive source and circuitry and optionally a second ionization chamber with radioactive source and an additional electrode, the central of the three electrodes serving both chambers and with sensitivity controls.

In a preferred embodiment, an ionization fire alarm signal box is described comprising an ionization measuring chamber with a tubular housing wall, electrodes mounted in the measuring chamber parallel to each other and perpendicularly to the axis of the tubular housing wall, means to apply an electric potential to the electrodes, at least one radioactive source which produces an ionization stream between the electrodes; in which structure the tubular housing wall projects in axial direction above the electrodes and supports at one of its ends a covering which permits the entry of ambient air into the measuring chamber and whose edge is fastened to the tubular housing wall, said covering being axially spaced from the adjacent electrode, and creating a baffle chamber.

23 Claims, 11 Drawing Figures

IONIZATION ANALYZING AIR POLLUTION, SMOKE AND FIRE ALARM DEVICE

BACKGROUND OF THE INVENTION

Description of the Prior Art

The prior foreign art describes a fire alarm signal box with a covering and the electrode adjacent thereto constituted by grids which are fastened to the outside edges of a tubular housing wall and between which a blower is arranged. This blower conveys ambient air through the covering and the electrode adjacent thereto, and along a plate electrode further distant from the covering and impermeable to air, to the open end, opposite to the covering, of the tubular housing wall, which end is covered by a further protective grid. Since ions are torn away by the air stream from the area between the two electrodes, a further blocking electrode, formed by a grid, is provided in the air stream, downstream of the plate electrode impermeable to air, which blocking electrode prevents such ions from leaving the ionization chamber and, for this purpose, is electrically connected to the electrode adjacent to the covering. The blower and the blocking electrode require a large structural expenditure.

An ionization fire alarm signal box is known wherein the ionization chamber is formed in the suction chamber of a cylinder in which a piston operating as an air conveyor moves back and forth. In that structure, the suction chamber is covered at opposite sides by a covering constituted by a filter, and open toward the cylinder. Two electrodes are provided in each case shaped as plate electrode impermeable to air, and arranged at a distance from one of the coverings that is small in comparison with the dimensions measured in the plate plane, and at a universal distance of their edge from the wall of the suction chamber. This structure presents the disadvantage that an air conveyor must be provided since otherwise the filters provided as coverings would strongly impede from entering the ambient air with particles carried by the fire.

In the aforementioned fire alarm signal boxes, the flow conditions in the ionization chamber are practically exclusively determined by flows produced by an air conveyor. Fire alarm signal boxes of a type similar to these are also known which operate without an air conveyor. In such fire alarm signal boxes, the difficulty occurs that flows of the ambient air lead to an undesirable change in sensitivity and to false alarms, and that this effect may vary according to the direction from which the flow approaches. For the elimination of this difficulty, various solutions are known.

An ionization fire alarm signal box is known which provides a wind guard in the form of cuplike protective shields, fitted into each other, with a multiplicity of small staggered openings, whereby the ambient air is repeatedly strongly deflected and thus strongly slowed down when entering the ionization chamber. The wind guard, however, likewise impedes the entry of ambient air mixed with combustion gases into the ionization chamber so that at low velocities of flow of the ambient air the sensitivity of the signal box is reduced.

The sensitivity to air flows is particularly marked in such ionization fire alarm signal boxes which have housings of small sizes since such housings can exert a function which protects the ionization chamber against air flows only to a small extent.

While the spaces normally and advantageously available for locating fire detectors, for instance in industrial plants, are of small sizes and it would also be logical to have the fire detectors of minute sizes in order to permit keeping them hidden from pranksters, mischief-makers and saboteurs, the prior art neglected to consider these aspects.

SUMMARY OF THE INVENTION

It is therefore an important object of this invention to produce the subject device of the smallest possible size without affecting its accuracy and the necessary prerequisites of safe assembly and dismantling thereof. The dimensions and proportions given as optimum are therefore for this purpose critical.

Another object of the invention is to construct a fire alarm signal box of a simple structure, avoiding an air conveyor, which has a constant sensitivity, independently of the magnitude and direction of possible flows of the ambient air. Yet another object of the invention is to provide the subject device with a housing of relatively minute dimensions, and which, nevertheless, permits ease of manufacture, assembly and repairs without endangering the persons which have to handle it by radiation.

According to the invention, the alarm signal box is provided with a first electrode developed adjacent to the covering as an electrode plate, impermeable to air, and arranged at an optimum distance from the covering that is small in comparison with the dimensions measured in the plate plane, and at a universal distance of its edge from the tubular housing wall. The covering is shaped preferably as a ring impermeable to air, with a central opening, the size and shape of the said opening resembling at least approximately those of the electrode plate adjacent to the covering.

When an air flow approaches a fire alarm signal box of the invention, it may strike the end that supports the covering in an approximately axial direction. The annular covering and the electrode plate adjacent to the covering and positioned closely behind the covering define a baffling zone, uninterrupted in plan view, in which the air flow is baffled without being able to penetrate directly into the measuring chamber. Only a portion of the air flow, which at the outside of the electrode plate is radially deflected outwardly enters through an annular slot between the covering and the first electrode plate adjacent thereto, and, after another deflection in axial direction, through the annular slot between the edge of the said electrode plate and the tubular housing into a first ionization measuring chamber. When an air flow approaches the fire alarm signal box in a direction about perpendicular to the axis of the tubular housing wall, the annular entrance opening is positioned between the covering and the first electrode plate adjacent thereto in the region sheltered from the prevailing air flow, by the free end of the tubular housing wall, so that in this case no direct inflow occurs into the measuring chamber either. In all directions of approach of the flow which are located between the extreme cases considered, the effects described become operative in combination, so that in each case, independently of the direction in which the air flow approaches, a protection of the measuring chamber is assured against strong air flows. This protection is achieved with the simplest means and in a space-saving manner, merely by the mutual arrangement and shaping of the covering and the adjacent first electrode plate, without requirement for other means.

Description of the Preferred Embodiments

Figure 1:
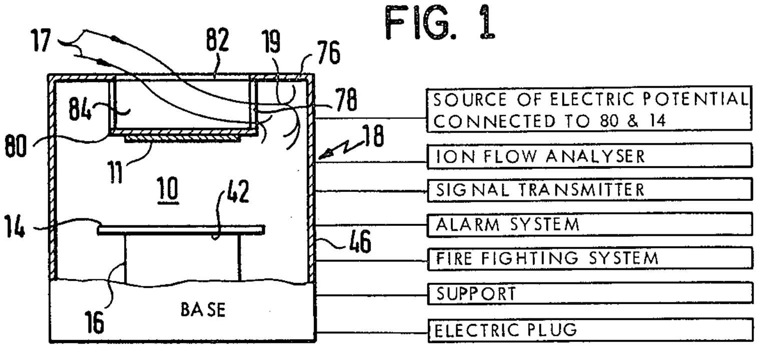
FIG. 1, is a cross-sectional view of a fire alarm signal box according to the invention, partly diagrammatic.

In the several figures, the same reference symbols indicate the same or equivalent elements; in the various views, elements which have the same function are marked with reference symbols which agree in the reference numberal but differ by means of added letters. Depiction of elements, applicable to the various embodiments and shown in at least one figure, is omitted in others for purposes of brevity. Because of the criticality of the optimum dimensions described and claimed hereinafter, the drawings are proportional; FIGS. 1 and 8 to 11 to scale of 1:1 and FIGS. 2 to 7 to scale of 2:1. The ionization fire alarm signal box shown in FIG. 1 comprises an outer first electrode plate 80 and a second central electrode plate 14 parallel thereto. The first electrode is impermeable to air, and is located adjacent to a covering 76. Both electrode plates 14, 80, and covering 76, each extend perpendicularly to the imaginary axis of the fire alarm signal box, which in FIG. 1 extends from the top to the bottom. With relation to this axis the signal box is essentially constructed in an axially symmetrical manner. Covering 76 at its edge is connected with a tubular housing wall 46 which as part of a housing encloses a first ionization measuring chamber 10 wherein the first and the second electrode plates 14, 80, respectively, are arranged. The central second electrode plate is fastened to a high-grade insulator 16. The electrode plates 14, 80 are electrically connected to an electric signal transmitter circuit with means to apply a potential to them. A first radioactive source 11, preferably an alpha radiator, is provided on the inside of the outer electrode plate 80 facing away from covering 76. The source ionizes the area of the first measuring chamber 10 located between the two electrode plates. This produces an ionization stream flowing between the two electrodes at the state of rest, i.e. in the absence of combustion products or air pollution in the measuring chamber. When combustion products, or air pollution particles enter, the ionization stream increases or decreases, and this change is detected by conventional ionization detecting devices, which are included in the signal transmitter circuit, whereupon the latter triggers a conventional alarm signal or actuates a fire extinguisher installation.

In order to obtain the highest sensitivity of the signal box possible, a small value of the electric field intensity in the area between the two electrode plates is chosen which amounts for example to a few volt/cm. The velocity at which the ions produced by the ion source move toward one of the two electrode plates 14, 80, depending on their plus or minus sign, amounts in this case to about 20cm/sec. When the velocity of motion of the air in the area between two electrode plates reaches a similar value, a substantial portion of the ions is carried off from the area between the two electrode plates. This reduces the ionization stream without the presence of combustion materials. This change in the ionization stream may lead to a false alarm. Therefore, higher velocities of motion must be avoided of the air in the measuring chamber 10.

MEANS TO AVOID A FALSE ALARM

To achieve this purpose, the first electrode plate is mounted spaced a small distance from the covering; the optimum distance amounts to a fraction of the diameter measured in the plate plane of the first electrode plate. Furthermore, covering 76 is annular and has a central opening 82. The size and shape of the latter corresponds, at least approximately, to the first electrode plate. In the embodiment shown on FIG. 1, the optimum diameter of the circular opening 82 equals that of the first electrode plate. The air baffle zone 84 is defined by the opening 82 in the covering as the air inlet side, the plane of the first electrode spaced parallel thereto and the connectors or spacers 78 with apertures in-between, connecting the inner edges of the covering with the first electrode.

When turbulent air such as produced by a fire is directed as shown in FIG. 1, by arrows at 17, from the opening downwardly, it strikes the covering 76 and the outer electrode plate perpendicularly and enters into the baffling zone, which prevents a direct entry into the measuring chamber and forces the air to deflect and enter the direction of flow indicated by the arrows 19, in FIG. 1. Also a possible lateral approach of the air is indicated by arrows 17. At higher air velocities, the lateral flow of air is deflected when it impinges upon the covering 76 and the outer electrode plate 80. Turbulences originate then at the edges, especially in the baffle zone, in which process the energy of the air flow is largely destroyed. A possibly stronger lateral air flow not sufficiently pacified in the baffle zone will enter through the annular passage opening between the outer electrode plate and the covering into the measuring chamber and will be baffled inside the measuring chamber 10 immediately by deflecting from the inside of the housing wall 46 which divides it and decreases its turbulent flow. The area of the measuring chamber between the two electrode plates is therefore protected against stronger air flows.

In order to decelerate the air flow, indicated by flow lines 19, most successfully before it enters the area between the two electrode plates, it is preferable that the universal distance between the edge of the first outer electrode plate and the housing wall is approximately equal to the distance between this first electrode plate and the covering. When the ambient air moves at low velocity, its entry into the ionization chamber 10 is not substantially impeded by the measures described. The outer electrode plate is fastened adjacent to covering 76 to the covering by means of fasteners, or crosspieces 78 extending toward the inner edge of the covering. The crosspieces are of such a narrow shape that for practical purposes they do not affect the air flow.

Thus in every instance the ambient air, possibly charged with combustion materials, enters through the annular gap between the edge of the outer electrode plate and the inside of the housing wall 46, approximately in axial direction of the signal box, into the area between the electrode plates. Entering smoke aerosols move therefore in approximately the same direction of flow as a large portion of the air ions produced by the ion source and accelerated in the electric field between the two electrode plates 14, 80, toward the latter. This promotes a deposition between particles of the smoke aerosols and air ions, and thus brings about a notable effect upon the signal box.

MEANS TO ASSEMBLE AND DISMANTLE

Preferably the insulator 16 shown is a portion of a base which closes the ionization chamber 10 toward a support, which supports the signal box, and on and from which the tubular housing wall 46 is detachably and telescopically slipped on or off.

The tubular housing wall 46, the covering 76, the crosspieces 78, and the outer electrode plate 80 may be combined for manufacture to form one integral element. By detaching the housing wall together with the outer electrode plate from the base, the second electrode plate, being supported on the insulator on the one hand, and the outer electrode plate and the radiation source on the other hand, become accessible to cleaning. The radioactive source, however, is in a protected position within the tubular housing wall so that for purposes of safety easy touching thereof by maintenance personnel is prevented.

The one piece manufacture of the tubular housing wall-crosspieces-covering and the outer electrode plate of conductive material is accomplished instead by conventional extrusion or by metallization of these elements or by any other electrically conductive mechanical connection between them. Thus the housing wall and the outer electrode plate jointly form the first outer electrode 18. A portion of the ionization stream flows then between the inside of the tubular housing wall and the second electrode plate. The outer electrode 18 is grounded. It acts thereby as a Faraday shield and avoids disturbances of the electric field between the two electrode plates and resulting false alarms otherwise caused by external interference fields.

MEANS TO MINIMIZE THE SIZE OF THE SYSTEM

FIGS. 2 to 6 depict additional improvements to the device of FIG. 1, in order to achieve a very small structural size. In a signal box of this type the inventor succeeded to reduce the outer diameter of the tubular housing wall to 36 mm, and the axial total height thereof to 30 mm, which is far below the sizes of the conventional fire detectors. This independent object is accomplished with the aid of the following circuitry, which, in addition, attains its own separate objects.

MEANS TO PROTECT AGAINST POLLUTION

The second electrode plate is supported on its rear that faces away from the outer electrode plate by an insulator 16. The outer optimum dimensions of the supporting surface 52 are smaller than those of the electrode plate 14 supported by it. In the embodiment, the diameter of the end of insulator 16, that is the top end in FIG. 1, is smaller than that of the two electrode plates 14, 80. Therefore, insulator 16 is positioned, with respect to entering ambient air, behind electrode plate 14 and is protected against pollution which could result in the flow of undesirable creeping currents. Similar measures are taken in the embodiments of FIGS. 8 to 11, which are hereinafter described in greater detail.

THE ELECTRICAL CIRCUITRY

Figure 2:
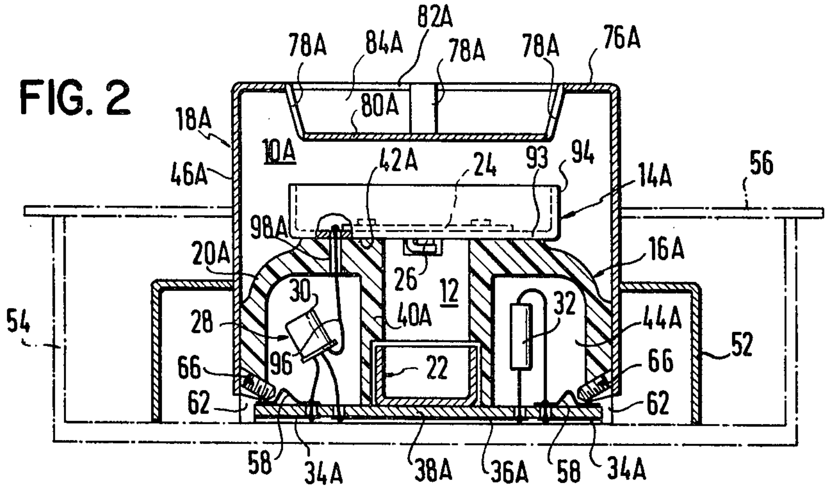
FIG. 2, is a cross-sectional view on an enlarged scale of the fire alarm signal box depicted on FIG. 1, showing additional improvements.

As shown in FIG. 2, the first measuring chamber and a second ionization reference chamber 12 are electrically series-connected. The measuring chamber 10A is defined by the partly platelike central second electrode 14A which is given a cup shape by means of an edge 94 cylindrically surrounding the circular plate-like middle portion 93. A cuplike insulator 16A supports the second electrode and is open at its rear, away from the second electrode, and a cuplike first electrode 18A. The first electrode 18A is telescopically mounted in a slipped-on manner on the outer periphery of the outer wall 20A of the insulator 16A.

The second chamber is formed in a central recess of the insulator between the rear of the second electrode and a third, inner electrode 22. On both sides of the second, central electrode a first and a second radioactive source 24 and 26 are provided which ionize both the first chamber 10A, and the second chamber 12. The circuitry produces ionization currents between the first, outer electrode and the second, central electrode on the one hand, and the second electrode and the third electrode, on the other hand.

When flame and smoke debris enters the first measuring chamber the ionization stream flowing therein changes. Thereby the potential of the second electrode changes, and by conventional circuitry triggers fire signalling. For the utilization of the potential modifications of the second electrode, a signal transmitter circuit 28, connected to all three electrodes comprises a field effect transistor 30 and a resistor 32. The circuit connections between the circuit elements 30 and 32 include conductors 34A, 36A shown on FIG. 2, in heavier print. They are provided preferably as a printed circuit on the rear side, facing away from the insulator of a wiring plate 38A, in one plane. The wiring plate abuts against the rear end of the insulator which faces away from the middle electrode.

In the alternative, the plane of the circuit connections of the signal transmitter circuit is formed at the rear end of the insulator by fixing there, for instance by casting, individual conductors connecting circuit elements 30, 32.

The insulator is furthermore provided with an inner wall 40A which is connected with the outside wall 20A of the conductor in the area of the bearing surface 42A of the second electrode, envelops the second chamber 12 in a tubular manner and extends, approximately to the plane of the circuit connections, the conductor lines 34A, 36A.

For purposes of simplicity of description, a plane of the circuit connections is defined, which actually is not a geometrical plane, but in consideration of the always finite extension of the circuit connections, as an essentially plane area of very small thickness. The circuit connections are thus considered to be positioned in one plane even if in deviation thereof they are shown for easier understanding on the top and rear of the wiring plate 38A of FIG. 2. The third electrode rests, within the meaning of the above definition upon this plane, for inst. by being glued to the top side of the wiring plate.

All circuit elements 30, 32 of the signal transmitter circuit are arranged in the space 44A which is formed between the outer wall 20A and the inner wall 40A of the insulator, which is open toward the plane of the circuit connections. This space is continuous in peripheral direction, and therefore presents an annular space. The alternative thereto is to provide the sapce 44A divided for instance by radially extending subdivisions, in order to insulate the adjacent circuit elements 30, 32 electrically and/or thermally from each other.

The optimum inner dimensions of the inside wall 40A of the insulator amount to approximately half of the outer dimensions of the outside wall 20A thereof. Thereby the second chamber is still sufficiently large for all practical purposes, while in the space 44A sufficient area is provided for the placement of the signal transmitter circuit.

Figure 3:
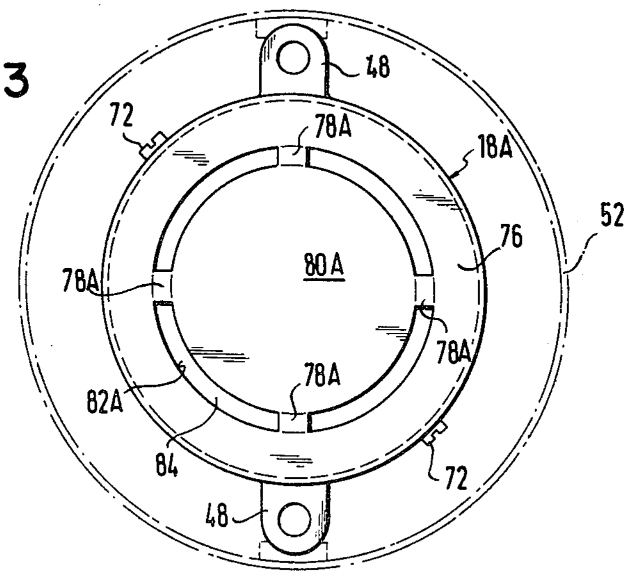
FIG. 3, is a plan view upon a fire alarm signal box according to FIG. 2, arranged in a tubular housing.
Figure 4:
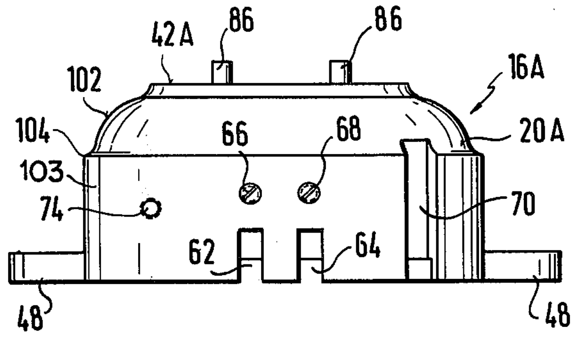
FIG. 4, is a side view of the insulator of the fire alarm signal box according to FIG. 2.

As shown on FIGS. 3 and 4, the insulator is provided with two fastening prolongations 48 extending outward from outside wall 20A, which for the purpose of fastening the fire alarm signal box to a support, are provided each with an opening for fastening screws. For the purpose of covering, a decorative ring 52, is slipped over the fastening prolongations 48. The fire alarm signal box may be mounted in a flush socket 54, as normally used for household flush sockets and switches, and in this case a flat decorative ring 56 is employed instead of ring 52 (FIG. 2). In the mounting in a flush socket 54, the fastening prolongations may be shaped similarly to those of household flush sockets, or the like, for holding fastening angles which are expanded outwardly by tightening a screw and thereby hold the fire alarm signal box in the cylindrical wall of the socket.

For the purpose of connecting the signal box to two conductors of an electric line, the box is provided on each of the two opposite sides with two, therefore a total of four, pairwise connected contact elements, whereof two contact elements 58 connected through conductor line 34 A are visible in FIG. 2. The contact elements are fastened on the upper side of the wiring plate 38A, facing the insulator and they consist each of a section positioned within an introduction opening 62,64 and a section bent off therefrom in an obtuse angle and extending perpendicularly to a clamping screw 66,68 as shown on FIG. 4. The introduction openings are formed in the outside wall 20A of that edge of the insulator that faces the wiring plate. Clamping screws 66, 68 are screwed in to threaded holes provided in the outside wall 20A and slanting toward the contact elements 58,60.

FIG. 4 shows an axially extending groove 70 at the outer circumference of outside wall 20A of the insulator. When the fire alarm signal box is completely mounted, this groove holds a contact spring, which is fastened to wiring plate 38A. This contact spring abuts against the inner circumference of the tubular housing wall 46A which forms a portion of the first electrode 18A and thereby establishes the electric connection between the electrode plate 80A, which forms likewise a portion of the outer electrode 18A, and the signal transmitter circuit 28.

MEANS TO ADJUST SENSITIVITY

The adjustment of the sensitivity of the signal box is carried out simply by means of keeping the entire outer electrode 18A axially adjustable on the outer wall 20A of the insulator. For this purpose, the outer electrode 18A is fastened, by means of set screws 72, shown on FIG. 3, which pass through the outer electrode to the insulator. The set screws are screwed in tapped holes, e.g. in a tapped hole 74 shown on FIG. 4, in the outer wall 20A. The tubular housing wall 46A is provided with two axially-extending guide slots, which are engaged by the set screws 72, so that they act in the case of an axial displacement as a guide element which guides the outer electrode 18A. The same measures are applicable to FIGS. 1, and 8 to 11, but not shown there in detail for purposes of clarity.

To obtain a higher precision of adjustment axial displacement of the outer electrode 18A may be achieved by a modified shape of the guide slots, not shown. In that case the tubular housing wall 46A is provided with at least one guide slot extending like a spiral engaged by a guide element, fastened in the outside wall 20A of the insulator and guiding the housing wall 46A in a rotation and the simultaneously produced axial adjustment of the outer electrode 18A.

The outer electrode 18A consists, in a manner similar to that of FIG. 1, in addition to the already mentioned tubular housing wall, which is impermeable to air, also of an annular cover 76A, impermeable to air and fastened with its outer edge to the housing wall, and of the electrode plate 80A, impermeable to air which is positioned axially within covering 76A parallel to the middle electrode 14 and connected electrically and mechanically to the covering by way of crosspieces 78A. The central opening 82A of the covering approximately resembles in size and shape the electrode plate 80A. Instead to the covering the electrode plate 80A may be directly connected, electrically and mechanically, to the inside of the tubular element 46A.

The optimum distance between the electrode plate 80A and the platelike portion 93, parallel thereto, of the second electrode 14A is smaller than, and preferably half the size of the outer dimensions thereof, measured in the plate planes concerned. The axial height of the edge 94 of the second electrode is approximately half as large as the distance between the electrode plate 80A and the platelike portion 93 of the second electrode 14A. Thus the design and arrangement of the parts by the aforementioned optimum dimensioning permit simultaneously a small axial structural height when compared to conventional devices of the prior art.

Figure 5:
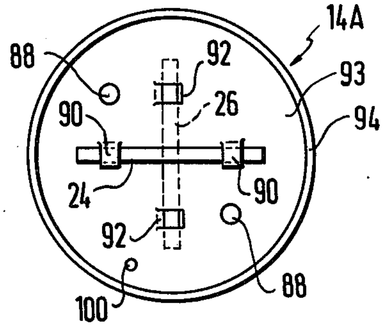
FIG. 5, is a plan view upon an optional second, central electrode of the fire alarm signal box according to FIG. 2.

As shown on FIGS. 4 and 5, the insulator is provided with fastening cams 86 projecting from the bearing surface 42A of the second electrode 14A, which cams pass through corresponding openings 88 thereof. After the second electrode has been mounted on the insulator, the cams 86 are thickened by thermal molding, for the purpose of fastening them to a head abutting against the outside of the platelike portion 93 of the second electrode 14A, shown on FIG. 5.

As shown on FIGS. 2 and 5, the radioactive sources 24, 26 are each shaped as an elongated band section. They extend crosswise and are fastened each by means of two hooks 90,92, punched out from the platelike portion 93 of the second electrode and the overlapping source 24 or 26.

The edge 94 extending from the platelike portion 93 of the second electrode in the direction toward the electrode plate 80A together with the special shape and arrangement of outer electrode 18A improves the insensitiveness of the signal box to flows of the ambient air. The optimum diameter of the edge 94 is at least approximately equal to the diameter of the electrode plate 80A. The edge 94 presents the advantage that the second electrode 14A, before being connected to the insulator 16A, can be deposited, stored, and transported, on the edge 94 facing the bottom. Thus the radioactive sources 24, 26 are protected against damages. The same applies, after the connection of the second electrode 14A, to the insulator 16A with respect to the protection of the source 24 when the signal transmitter circuit 28 is installed in the space 44A of the insulator.

MEANS TO PROTECT AGAINST INTERFERENCE FIELDS

As shown on FIG. 2 in connection with FIG. 5, the conductor 96, which connects the second electrode 14A to the signal transmitter circuit 28, namely, the base connection of the field effect transistor 30, passes through a channel 98A, ending in the bearing surface 42A of the second electrode 14A on the insulator, in the insulator and through an opening 100, aligned with the mouth in the second electrode and is soldered to the second electrode on the outside of the platelike portion 93 that faces away from the insulator. This results in a small length and a position of the conductor 96 which is thus largely protected against the influence of interference fields.

In order to create a substantial insulating distance between the middle electrode 14A and the outer electrode 18A on the outside 102 of the outside wall 20A of the insulator without imparting to the insulator a shape that would be difficult to produce and complicated, and without notably impairing the volume of space 44A, the outside 102 presents the shape shown on FIGS. 2 and 4. The optimum outside dimensions of the bearing surface 42A of the second electrode on the insulator are smaller than the outer dimensions of the platelike portion of the second electrode and the outside 102 of the outside wall 20A extends in the vicinity of the bearing surface 42A at a short distance to the platelike portion 93 and approximately parallel thereto. Furthermore, the optimum axial height of that cylindrical area of the outside 102 of the outside wall 20A, against which the tubular housing wall 46A abuts, is smaller than the axial total height of the insulator.

As shown on FIG. 4 the outer surface 103 of the outer wall 20A of the insulator 102 extends above the abutment surface of the tubular housing 46A above an edge 104 — in the direction toward the second electrode, first at a small distance from the inside of tubular housing wall 46A and approximately parallel thereto.

Figure 6:
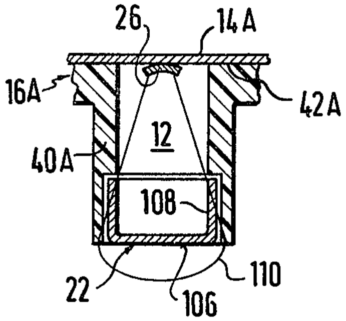
FIG. 6, is a further enlarged illustration of a second chamber of the fire alarm signal box according to FIG. 2, with a drawn-in radiation diagram.

As shown especially on FIG. 6, the inside electrode 22 is cuplike and is provided with a plane front wall 106 resting on the plane of the circuit connections, namely, on the top side of the wiring plate 38A as depicted on FIG. 2 and a tubular wall 108 positioned within the inside wall 40A of the insulator which is tubular, and open toward the second electrode. The axial length of the tubular wall 108 is necessarily smaller than the distance of the plane frontal wall 106 from the second electrode, preferably at most equal to half of this distance. The inner dimensions of the inside wall 40A in the axial area of the tubular wall 108 increase to such an extent that it does not touch the outside of the tubular wall 108. Thus an insulation path is produced of a maximum possible length between electrodes 14A and 22.

FIG. 6 depicts a diagram 110 which connects all points of a specific value of the radiation intensity of the ionizing radiation in an axial plane, intersecting with the radioactive source 26 when the inner electrode is removed. The specific value of the radiation intensity is the value that prevails in the axial direction at a distance from the electrode 14A which corresponds to the average range of the ionizing radiation. The diagram presents a club-like shape, which is achieved by means of a concave curvature of the band-like source 26 in the direction toward the electrode 22. By means of the club-like shape of the diagram 110 and the cup-like shape of the third electrode 22 the result is achieved that diagram 110 intersects with the tubular wall 108.

Thus, ionizing radiation is largely prevented from striking the inside of the inside wall 40A of the insulator. Since most materials used for the insulator, especially high-value plastic materials, exhibit a diminution of their insulating effect as a result of radioactive radiation, the aforementioned measures prevent a deterioration of insulating properties in reference chamber 12.

When the signal box is connected to an electric line, preferably the outer electrode, first electrode 18 of FIG. 1, or 18A of FIG. 2, is grounded in all embodiments. In battery-operated embodiments, the first electrode would be connected to the prevailing mass potential. Thereby the outer electrode acts as a shield against disturbing foreign fields. An alternative provision to that, shown on FIG. 2, is to extend those electric connections between the circuit elements 30,32 of the signal transmitter circuit 28, whose potential deviates from the ground potential, exclusively on the top side of the wiring plate 38A which faces the insulator. An additional measure for diminishing the influence of the foreign fields, is the provision of the rear side of the wiring plate with an electrically conductive and preferably grounded coat. Thus in an alternative to the embodiment shown in FIG. 2, it would be feasible to cover instead, if necessary, the rear side of the wiring plate with a grounded covering insulated against conductor lines 34A, 36A, and possibly grounded.

Figure 7:
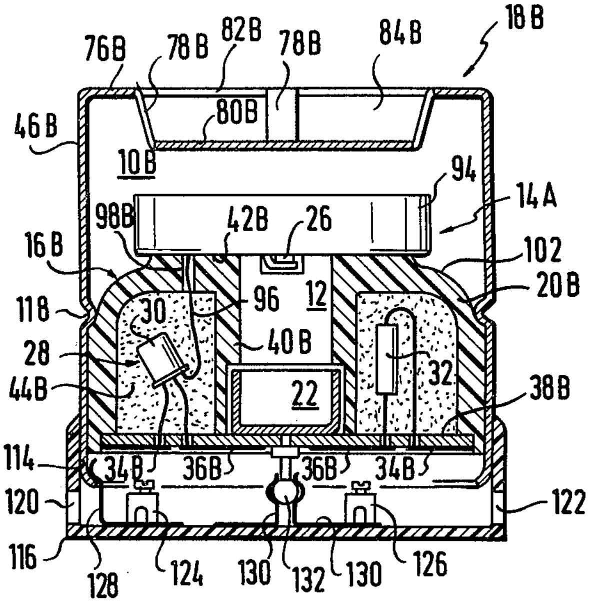
FIG. 7, is a cross-sectional view of a fire alarm signal box depicted on FIG. 1, showing additional improvements.

The embodiment shown on FIG. 7 corresponds largely to that of FIGS. 2 to 6. However, here the outer electrode 18B, which in the portion that in the Figure is the top portion of the outer electrode 18A of FIG. 2, comprises a tubular wall 46B which is held, along a likewise tubular section 114, extending axially beyond the rear side of the insulator 16B, by a mounting base 116. The insulator is fastened here within the tubular housing wall 46B by a circuitous stiffening corrugation 118 in its axial position and is not provided with fastening prolongations.

In the base 116 are provided introduction openings 120,122 for an electric line, and connecting terminals 124,126 for connecting two conductors of the electric line. These connecting terminals 124,126 are each electrically connected, by way of a resilient and resting connection, to the section 114 extending axially beyond the rear side of the insulator, and to the third electrode 22. The connection between the connecting terminal 124 and the section 114 takes place by way of a spring 128 which rests in a groove of section 114. At least one of two resting springs 130, which are provided, is connected to the connecting terminal 126. The third electrode 22 is fastened, by means of an electrically conductive fastening element 132, constructed as a pin to the wiring plate 38B, on the rear side of the wiring plate facing away from the insulator, against which pin the springs 130 abut.

In the embodiment of FIG. 7, the signal transmitter circuit 28 is cast with a casting resin, that fills the space 44B, and simultaneously fastens the wiring plate to the rear of the insulator.

Figure 8:
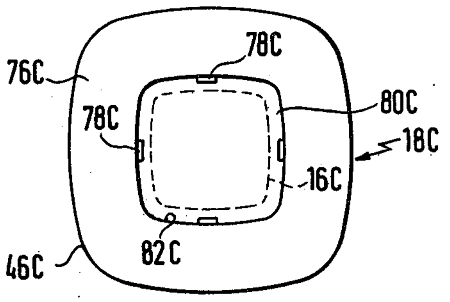
FIG. 8, is a plan view upon a fire alarm signal box according to FIG. 1 arranged in a substantially rectangular housing with rounded sides and corners.

In pursuance of the object of minimizing the size of the device in the embodiments of FIGS. 1 and 2, and also in the following embodiments of FIGS. 9 to 11, the cross section of the signal box is circular. FIG. 8 shows another equally advantageous shape which may be substituted in the aforementioned other embodiments and in which the cross sections of the tubular housing wall 46C of the first electrode plate 80C and of the here non-visible second electrode, are approximately square-shaped and rounded. The same applies to the insulator 16C as indicated in dash lines, the covering 76C, and the opening 82C provided therein. This makes it possible to achieve, at the same structural height, a larger volume of the measuring chamber than with the circular shape. The outer electrode plate 80C is again fastened to the covering 76C by way of cross-pieces 78C.

Figure 9:
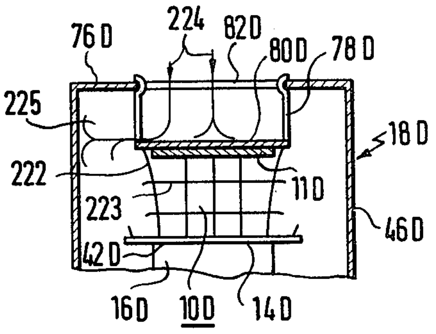
FIG. 9 is a cross-sectional view through a fire alarm signal box according to FIG. 1, showing the external electrode detachably mounted.

FIG. 9 shows a detail of a detachable fastening of the first electrode plate 80D. The electrode plate can be removed from the measuring chamber 10D through covering 78D. This is advantageous, especially when the activity of the radioactive radiator 11D is of such a low value that it can be touched by maintenance personnel without risk. After the removal of the outer electrode plate 80D, the inside of the ionization chamber 10D, and the inner electrode plate 14D, as well as the outer electrode plate 80D and the radiator 11D, can be cleaned without loss to the sensitivity of the adjustment carried out by means of the axial setting of the tubular housing portion 46D, described on FIG. 2. The outer ends of the cross-pieces 78D are connected with the outer electrode plate 80D and extend toward the covering 76D. The detachable fastening of the electrode plate 80D to the other parts of the outer electrode 18D is accomplished by providing each cross-piece with a semi-circular deflection by means of which they rest in each case in a corresponding recess at the inner edge of opening 82D.

In the embodiment of FIG. 9, similar to the embodiments of FIGS. 7,8,10 and 11, and optionally FIGS. 2 to 7, the electrode 14D mounted in measuring chamber 10D, and more distant from the covering 76D, is of the same dimensions, i.e. of the same diameter as the outer electrode plate 80D and like the latter plate-shaped. An approximately homogenous electric field prevails between the electrode plates 14D,80D, whereby in the area between the electrode 14D, 80D accelerations of approximately the same magnitude are exerted upon the existing ions.

Thereby this entire area has an optimum accumulation effect of smoke, and air pollution particles upon the ions and thus the highest possible sensitivity of the signal box. The smooth shape of the electrodes 14D, 80D prevents pollution and facilitates cleaning, which may become desirable after a long service. A plane electrode plate may also be provided for the cup-like second electrode 14A described with reference to FIGS. 2 to 6, and in FIG. 7.

FIG. 9 indicates the shape of the field lines 222 and of the equipotential lines 223 of the approximately homogenous electric field in the area, positioned between the electrode plates 14D, 80D of the ionization chamber 10D. Arrows 224 indicate the shape of a possible stronger air flow striking the signal box axially, while flow lines 225 indicate the turbulence thereof when it enters the ionization chamber 216 at the inside of the tubular housing wall 46D.

Figure 10:
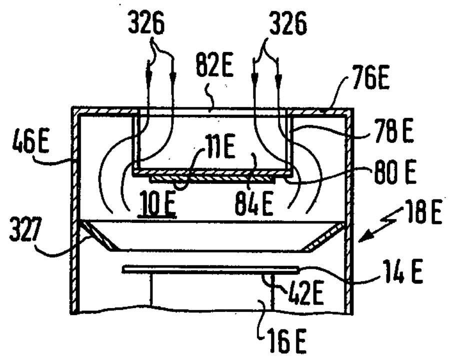
FIG. 10, is a cross-sectional view of the device according to FIG. 1, including a device for deflecting the air within the ionization chamber.

In FIG. 10, a possible weak air flow of the signal box in axial direction is shown, wherein a laminar flow indicated by flow lines 326 prevails. This flow passes through the opening 82E in the covering 76E, the passage opening 84E between the outer electrode plate 80E and the covering 76E, and the gap between the edge of the outer electrode plate 80E and the tubular housing wall 46E, and enters the ionization chamber 10E, without being impeded in by the narrow cross-pieces 78E. The signal box is in this case provided with a guide ring 327 parallel to the electrode plates 14E,80E and is arranged between them. The ring extends from the tubular housing wall 48E inwardly and has a shape conically tapering toward the electrode plate 14E. Thus the ambient air with smoke aerosols contained therein, entering the ionization chamber 10E, is advantageously guided into the area between the electrode plates 14E,80E. The insulator 16E is positioned underneath, and with its supporting surface 42E behind the electrode plate 14E. The guide ring 327 largely prevents dust from reaching the insulator, from being deposited there and from causing creeping currents. For this purpose the optimum dimensions of the inner opening of the guide ring 327 are smaller than those of the electrode plates 14E,80E. The use of a guide ring 327 made of insulating material also prevents a lateral expansion of the electric field between the electrode plates 14E,80E, and thereby keeps it homogenous.

MEANS TO MAINTAIN HIGH ACCURACY

Figure 11:
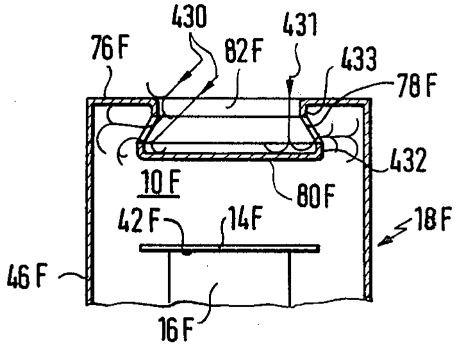
FIG. 11, a cross sectional view of the device according to FIG. 1, showing particularly shaped edges on the covering and the adjacent electrode plate in the baffling zone.

FIG. 11 shows a partial cross-section of a specifically shaped outer electrode 18F. Such an electrode is preferable at places, where, particularly high velocities of the ambient air occur, such as e.g. in air conditioning channels.

The outer edge 432 of the outer electrode plate 80F adjacent to the covering 76F is bent toward it. The bent edge 432 deflects strongly the entering air and makes it turbulent, as indicated by flow lines 431 of an axial approach of the air. For high velocities of the ambient air the inner edge 433 of the covering 76F is shown bent toward the adjacent outer electrode plate 80F.

Preferably the diameter of the opening 82F of the covering 76F is somewhat smaller than that of the outer electrode plate 80F. Thus a strong turbulence of a lateral air flow, indicated by flow lines 430, is likewise achieved and the area between the electrode plates 14F,80F remains protected against air flow.

Conventional signal producing circuitries, such as described in U.S. Pat. Nos: 3,775,616 and 3,666,954 identified hereinbefore, are usable in connection with the present device.

It is to be understood that the second chamber, a reference chamber, shown and described only with reference to FIGS. 2 and 7 optionally, is equally applicable to FIGS. 1,9,10 and 11 and description thereof with reference to these Figures has been omitted for purposes of brevity.

What is claimed is:

1. An ionization analyzing air pollution and fire alarm signal device comprising:

a symmetrical housing including an outer wall and a peripheral cover with a central opening permitting passage of ambient air therethrough;

at least two electrodes;

a first electrode, having a planar portion mounted in said housing adjacent said cover of a size and surface shape conforming to those of said opening in said cover; and a second electrode located within said housing;

one end of said outer wall of said housing projecting axially beyond said first electrode and forming a sealing support for the outer edge of said cover;

spacers with apertures between them connecting said housing with said first electrode;

said cover defining together with said first electrode a baffle zone;

said cover, the planar portion of said first electrode and said second electrode mounted in planes parallel to each other perpendicularly to the axis of said housing and spaced from each other distances permitting passage of ambient air from said baffle zone and from there between said two electrodes;

the walls of said housing defining together with the said two electrodes a partially closed first chamber protected from excessive fluctuations of ambient air by said baffle zone;

a first radio-active source for ionizing said first chamber, and an electrical circuit connected to said two electrodes and being responsive to changes in electrical characteristics of the atmosphere in said first chamber.

2. An ionization analyzing air pollution and fire alarm signal device, as claimed in claim 1, said housing being electro-conductive and electrically connected to combine with said first electrode, into a combined first electrode.

3. An ionization analyzing air pollution and fire alarm signal device, as claimed in claim 1, further comprising means permitting a detachable fastening and removal of said first electrode through the said cover.

4. An ionization analyzing air pollution and fire alarm signal device, as claimed in claim 1, further comprising an insulator, said second electrode mounted on said insulator.

5. An ionization analyzing air pollution and fire alarm signal device, as claimed in claim 1, further comprising a guide ring;

said guide ring mounted parallel to and between the first and second electrodes;

the said first chamber and said guide ring extending from the tubular housing wall inwardly;

said guide ring having its inner opening of dimensions smaller than those of the said electrodes.

6. An ionization analyzing air pollution and fire alarm signal device, as claimed in claim 1, said second electrode being shaped essentially as a plane electrode plate.

7. An ionization analyzing air pollution and fire alarm signal device, as claimed in claim 1, said second electrode having a bearing surface smaller than the outer dimensions of the said electrode.

8. An ionization analyzing air pollution and fire alarm signal device, as claimed in claim 1, the first electrode being grounded.

9. An ionization analyzing air pollution and fire alarm signal device, as claimed in claim 1, further comprising an insulator forming a base for said housing.

10. An ionization analyzing air pollution and fire alarm signal device, as claimed in claim 9, said outer wall of said housing being tubular;

said insulator being tubular and of a diameter mating with the tubular shape of said housing and permitting slipping on of said housing thereover.

11. An ionization analyzing air pollution and fire alarm signal device, as claimed in claim 9, a platelike portion of said second electrode resting on said insulator, the distance between said planar portion of said first electrode, and said platelike portion of said second electrode being smaller than, and preferably half of, the outer dimensions of the said second electrode.

12. An ionization analyzing air pollution and fire alarm signal device, as claimed in claim 9, said insulator provided with fastening cams projecting from the bearing surface of the second electrode;

said cams passing through corresponding openings of the second electrode and thickened on the outside of the second electrode that faces away from the insulator, to a head abutting against this outside.

13. An ionization analyzing air pollution and fire alarm signal device, as claimed in claim 9, further comprising:

a base provided with at least one introduction opening for an electric line;

said housing wall being held on a section of the insulator and extending axially beyond the rear side thereof;

a plurality of connecting terminals for connecting conductors of the electric line;

two of these connecting terminals being connected each by way of a resilient, preferably resting connection electrically to the section extending axially beyond the rear side of the insulator.

14. An ionization analyzing air pollution and fire alarm signal device, as claimed in claim 9, the tubular housing being axially adjustable on the outer wall of the insulator.

15. An ionization analyzing air pollution and fire alarm signal device, as claimed in claim 14, the wall of said tubular housing being provided with at least one axially extending guide slot, engaged by a guide element guiding the said wall when the latter is being axially displaced, said guide element being fastened in the outside wall of the insulator.

16. An ionization analyzing air pollution and fire alarm signal device, as claimed in claim 14, said tubular housing wall being provided with at least one guide slot shaped as a spiral line, said line being engaged by a guide element fastened in the outside wall of the insulator to guide the housing wall when the latter is being turned.

17. An ionization analyzing air pollution and fire alarm signal device, as claimed in claim 1, said first electrode being a plate electrode impermeable to air, mounted spaced from the cover a distance small in comparison with the dimensions measured in the plate plane, and a universally equal distance of the edge from the said wall.

18. An ionization analyzing air pollution and fire alarm signal device, as claimed in claim 17, the universal distance of the edge of the first electrode from the said housing wall equalling approximately the distance between the said electrode plate and the said cover.

19. An ionization analyzing air pollution and fire alarm signal device, as claimed in claim 17, the first electrode and the second electrode having about the same outer dimensions.

20. An ionization analyzing air pollution and fire alarm signal device, as claimed in claim 17, the inner edge of the said cover and the outer edge of the said first electrode plate being bent to be adjacent to each other.

21. An ionization analyzing air pollution and fire alarm signal device, as claimed in claim 1, said spacers connecting said housing with the said first electrode being fastened to the inner edge of the said central opening of said cover.

22. An ionization analyzing air pollution and fire alarm signal device, as claimed in claim 21, and fasteners resting on the inner edge of the said central opening detachably and resiliently.

23. An ionization analyzing air pollution and fire alarm signal device, as claimed in claim 21, said housing, said cover, said fasteners and the said first electrode plate forming an integral unit.

* * * * *

UNITED STATES PATENT OFFICE
CERTIFICATE OF CORRECTION

PATENT NO. : 3,935,465

DATED : January 27, 1976

INVENTOR(S) : HARTWIG BEYERSDORF

It is certified that error appears in the above-identified patent and that said Letters Patent are hereby corrected as shown below:

On the cover sheet item (30) "2403418" should read

-- 2403428-- .

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*